United States Patent [19]

Yasosky et al.

[11] Patent Number: 4,940,595

[45] Date of Patent: Jul. 10, 1990

[54] CONTROLLING THE TEXTURE OF MICROWAVE BROWNIES

[75] Inventors: John J. Yasosky, Maple Grove; Patricia W. Hahn, Plymouth; William A. Atwell, Andover, all of Minn.

[73] Assignee: The Pillsbury Company, Minneapolis, Minn.

[21] Appl. No.: 249,017

[22] Filed: Sep. 26, 1988

Related U.S. Application Data

[62] Division of Ser. No. 113,129, Oct. 27, 1987.

[51] Int. Cl.$^5$ .............................................. A21D 13/8
[52] U.S. Cl. .................................... 426/243; 426/552
[58] Field of Search ............... 426/243, 241, 242, 244, 426/549, 552

[56] References Cited

U.S. PATENT DOCUMENTS

| | | |
|---|---|---|
| 2,611,704 | 9/1952 | Jaeger . |
| 3,071,472 | 1/1963 | Hager et al. . |
| 3,235,457 | 2/1966 | Laden . |
| 3,544,334 | 12/1970 | Kozlik . |
| 3,560,221 | 2/1971 | Bellerose et al. . |
| 3,615,683 | 10/1971 | Hoynak . |
| 3,738,841 | 6/1973 | Toscano . |
| 3,875,309 | 4/1975 | Johannes . |
| 3,973,050 | 8/1976 | Hayashibara et al. . |
| 4,042,714 | 8/1977 | Torres . |
| 4,154,855 | 5/1979 | Buck . |
| 4,230,731 | 10/1980 | Tyler ................................... 426/233 |
| 4,293,577 | 10/1981 | Cillario . |
| 4,310,556 | 1/1982 | Suggs et al. . |
| 4,350,713 | 9/1982 | Dyson et al. . |
| 4,396,635 | 8/1983 | Roudebush et al. . |
| 4,409,250 | 10/1983 | Van Hulle et al. . |
| 4,419,377 | 12/1983 | Seward et al. . |
| 4,444,799 | 4/1984 | Vanderveer et al. . |
| 4,455,333 | 6/1984 | Hong et al. . |
| 4,503,080 | 3/1985 | Brabbs et al. . |
| 4,520,251 | 5/1985 | Yokozeki ............................ 426/243 |
| 4,533,809 | 8/1985 | Eke ..................................... 426/243 |
| 4,624,856 | 11/1986 | Vanderveer et al. . |
| 4,650,686 | 3/1987 | Young et al. . |
| 4,781,938 | 11/1988 | Pflaumer et al. . |

OTHER PUBLICATIONS

P. E. Hutchins, "Effect of Emulsifiers on the Texture of Cookies," *Journal of Food Science*, 1977, vol. 42, No. 2, p. 399.

David T. Rusch, "Emulsifiers: Uses in Cereal and Bakery Foods," *Cereal Foods World*, Mar. 1981, col. 16, No. 3, p. 111.

General Mills, Inc., *Betty Crocker's Microwave Cookbook*, (New York: Random House, Inc., 1981), p. 204.

Mary Jo Bergland et al., *The Best of Microcookery Cookies*, (1978), p. 11.

General Mills, Inc., *Betty Crocker's Microwave Cooking*, (Racine: Western Publishing Company, Inc., 1977), p. 54.

General Mills, Inc., *Betty Crocker's Microwaving for One or Two*, (New York: Random House, Inc., 1985), p. 21.

Better Homes and Gardens, *Step-by-Step Microwave Cook Book*, (Des Moines: Meredith Corporation, 1987), p. 80.

Caloric Corporation, *Oven Magic Cookbook*, (New York: The Benjamin Company, Inc., 1982), p. 164.

Irena Chalmers et al., *Creative Microwave Cooking*, (Ottenheimer Publishers, Inc., 1976), p. 140.

Lila Chalpin, *A New Look at Microwave Cooking–A Practical Guide to the Possibilities of Your Microwave Oven*, (New York: Dorison House Publishers, 1976).

Publications International, Ltd., *Microwave Cooking Class Cookbook*, (New York: Beekman House, 1983), p. 92.

(List continued on next page.)

*Primary Examiner*—R. B. Penland
*Attorney, Agent, or Firm*—Arnold, White & Durkee

[57] ABSTRACT

The texture of high sugar, relatively low moisture, flour based products baked in a microwave oven can be controlled by regulating the steam retention capabilities of the batter. The steam retention capabilities of the batter can be affected by the use of an emulsifier in the batter.

3 Claims, 5 Drawing Sheets

OTHER PUBLICATIONS

Quasar Company, *Microwave Oven Cookbook–Insta Matic and Variable Power*, (1983), p.92.

Richard Deacon, *Microwave Oven Cookbook*, (Tucson: H. P. Books, 1974), p. 147.

Recipes Unlimited, Inc., *Enjoying Microwave Cooking–Discovery Delicious Recipes*, (1975).

Sadlack, Janet L., *Menus, Recipes and Time Guides–Microwave Meals Made Easy*, (1976), p. 37.

Ginger Scribner, *The Quick & Easy Microwave Oven Cookbook*, (New York: Brooke House Publishers, Inc., 1976), pp. 213–215.

Quasar Company, *Special Cookbook*.

Marcia Cone et al., *Mastering Microwave Cookery*, (New York: Simon and Schuster, 1986), pp. 530–531.

Roper, cookbook.

Quasar Company, *Microwave Oven Cookbook*, (1983).

General Electric Co., *The Combination Range Guide and Cookbook*, (1980), p. 294.

General Electric Co., *Countertop Microwave Oven Cookbook*, p. 222.

*The Microwave Guide & Cookbook*, p. 266.

Dorothy H. Pybus, *The Microwave Cookbook*, (Canada: Saltaire Publishing Ltd., 1975), p. 236.

Thelma Pressman, *The Art of Microwave Cooking*, (Chicago: Contemporary Books, Inc., 1983), p. 161.

Panasonic Company, *The Genius Panasonic Microwave Oven Cookbook*, (1983), p. 201.

Farm Journal, Inc., *Farm Journal's Country Style Microwave Cookbook*, (New York: Ballantine Books, 1984), pp. 150–152.

General Electric Co., *Versatronic Range User's Manual & Cookbook*, p. R48.

Farm Journal, Inc., *Farm Journal's Country–Style Microwave Cookbook*, (Philadelphia: Farm Journal, Inc., 1980), p. 88.

Richard Deacon, *Richard Deacon's Microwave Cookery*, (Tucson: HPBooks, 1977), p. 171.

General Electric Co., *Use and Care Guide and Cookbook*, pp. R105–R106.

Modern Maid, Inc., *An Exciting New World of Microwave Cooking*, (Pillsbury Publications, 1971).

Caloric Corporation and The Benjamin Company, Inc., *Modern Maid Microwave Cookbook*, (New York: The Benjamine Company, Inc., 1982), p. 120.

Panasonic, *Panasonic Microwave Variable Power Cookbook*, (1981), p. 61.

Diane P. Clark, Diane Clark's Microwave Cookbook, (New York: Hawthorn/Dutton, 1981), p. 179.

Montgomery Ward Co., Inc., *Adventures in Microwave/Convection Cooking*, (1983).

Panasonic, *Microwave Oven Cookbook*, (1974).

Panasonic, *Panasonic Microwave Oven Special Features Cookbook*, (1977), p. 41.

Panasonic, Panasonic *Microwave Oven Cookbook*, (1977), p. 64.

Culinary Arts Institute, *Adventures in Microwave Cooking*, (1979), p. 80.

Signature, *Exciting Adventures in Electronic Cooking*, pp. 34–35.

Thelma Pressman, *The Great Microwave Dessert Cookbook*, (Chicago: Contemporary Books, Inc., 1985), pp. 104–105.

Barbara Methven, *Basic Microwaving*, (1978), p. 136.

Owlswood Productions, Inc., *The Microwave Way*, (1978).

The Tappan Company, *The Tappan Creative Cookbook for Microwave Ovens and Ranges*, (New York: Holt, Rinehart and Winston, 1976), p. 290.

Toshiba America, Inc., *Everyday Microwave Cooking for Everyday Cooks–Variable Power Cookbook*, (1978), p. 167.

CiCi Williamson and Ann Steiner, *Micro Quick!, (Austin: Hart Graphics, 1984), p. 182.*

Meredith Corporation, *Whirlpool Micro Menus Cookbook*, (1982), p. 216.

Oxmoor House, Inc., *Microwave Cooking Made Easy*, (1978), p. 80.

CiCi Williamson and Ann Steiner, *Microwave Know-How*, (1981), p. 180.

The Benjamin Company, Inc., *Kenmore Microwave Cookery*, (New York: The Benjamin Company, Inc., 1982).

Litton Systems, Inc., *An Exciting New World of Microwave Cooking*, (Pillsbury Publications, 1971), p. 147.

Litton Systems, Inc., *Discover Combination Microwave Range Cooking*, (1975).

General Electric Co., *The Microwave Guide and Cookbook*, (1982), p. 209.

(List continued on next page.)

OTHER PUBLICATIONS

Barbara Harris, *Let's Cook Microwave!* Revised Edition, (1974), p. 109.

Barbara Harris, *Let's Cook Microwave* 3rd Edition, (1974).

Litton Systems, Inc., *Old Fashioned Goodness with Variable Power Microwave Cooking,* (1975), p. 159.

Microcook Meals & Mixes, pp. 113–114.

Litton Industries, *Your Invitation to Creative Electronic Cookery,* pp. 34–35.

Cyndee Kannenberg, *Ideals' Guide to Microwave Cooking,* (1978), p. 60.

Barbara Kafka, *Microwave Gourmet,* (New York: William Morrow and Company, Inc., 1987), p. 412.

Hardwick, *Microwave Cookbook,* p. 174.

Audrey P. Stehle, *Southern Living Microwave Cooking Made Easy,* (1978), p. 80.

CONTROLLING THE TEXTURE OF MICROWAVE BROWNIES

This is a division of application Ser. No. 113,129 filed Oct. 27, 1987.

FIELD OF THE INVENTION

The present invention is directed to a method for controlling the texture of microwave brownies by regulating the steam retention capabilities of the batter.

BACKGROUND OF THE INVENTION

The use of prepared mixes has greatly simplified the task of preparing baked goods, particularly higher sugar/low water sweet baked goods such as brownies, cookies, some types of cakes, and the like. To prepare these mixes for use, the aqueous ingredients such as water, milk, or eggs are added to the mix and stirred to form a homogeneous batter. This batter is then baked to produce a final product. The use of such mixes avoids the problem of assembling the various ingredients, measuring the desired quantities, and mixing them in specified proportions.

Brownies are a very popular snack food and dessert, and it would be desirable to provide a mix whereby one could make a quality brownie quickly in a microwave oven. A quality brownie has a uniform texture, generally fudgey to cake-like. However, during microwave baking of brownie batter, dramatic textural irregularities often occur in the final cooked product. In some cases, the center of the brownie is almost raw, while the edges are unacceptably hard. These hard spots were found to be largely random along the edges and throughout the brownie, and specific to individual microwave ovens.

Maintaining constant brownie texture is more difficult in microwave brownies than in conventional brownies. It was found that this was due to edge heating and because of the uneven delivery of energy to the batter. "Hot spots" were also found to be a result of this uneven heating, and can be caused by interference patterns specific to every microwave oven. Hot spots often set up convection induced flow currents in microwave batter products. However, because of the high viscosity of brownie batter, there is little convection flow of batter, and little batter intermixing during microwave cooking. This lack of intermixing contributes to uneven heating and overly cooked areas near microwave oven hot spots.

Roudebush et al., 4,396,635, disclose a microwave cake mix wherein an emulsifier system is used to provide a cake mix which provides tender cakes with superior appearance. There is no disclosure in this patent of control of steam retention in a low moisture/high sugar baked good such as a brownie mix, nor is there recognition of steam retention in the system or of control of hard spots.

SUMMARY OF THE INVENTION

It is an object of the present invention to overcome the above-noted deficiencies in the prior art.

It is another object of the present invention to provide a method for controlling the texture of high sugar, relatively low moisture flour-based products, such as brownies, baked in a microwave oven.

It is yet a further object of the present invention to control the texture of relatively low moisture, high sugar, flour based products such as brownies, baked in a microwave oven which can be regulated by controlling the steam retention capabilities of the batter.

It is yet a further object of the present invention to provide a mix for baking relatively low moisture, high sugar, flour based products such as brownies, in a microwave oven wherein the texture of the final baked brownie product can be controlled by use of emulsifiers.

The generation of hard spots in microwave baked relatively low moisture, high sugar, flour based products such as brownies, appears to be a direct result of the highest cooking temperature achieved Heating curves, as shown in FIG. 1, demonstrate the time necessary to attain the 125° C temperature where significant hard spot development begins. As shown in FIG. 1, some regions heat much more rapidly and to a higher final temperature than do others. FIG. 2 demonstrates the linear relationship ($r^2=0.76$) between final cooked temperature and firmness.

In a system composed mainly of sugar, flour, water, and fat, the final temperature achieved during heating is a direct measure of the sugar concentration in the aqueous phase (boiling point rise). As the concentration of sugar changes, so do the dielectric properties of the aqueous phase of the system, as shown in FIG. 3. Thus, the evaporative concentration of the sugar solution in the batter during baking improves the batter dielectrics so it is lossier and therefore a more efficient heater. This also allows temperatures well above those necessary to develop hard spots to be achieved through boiling point elevation. This appears to explain why hard spots are more pronounced in low moisture, high sugar, flour based baked goods, such as brownies and cookies, and hereinafter referred to as brownies for convenience, than in high moisture baked goods, such as cakes and quick breads.

Hard spots generally are not present in the brownies immediately after cooking, but develop rapidly as the brownie cools to room temperatures.

It is generally thought that, in cake type systems, gelatinized starch is responsible for setting the final structure. Fudgey-type brownies made with sucrose, however, lack appreciable amounts of gelatinized starch. Thus, it is evident that the setting mechanism in brownies is different from that of cakes. It has been found by experimentation that a major factor controlling the final set structure of a fudgey brownie is the viscosity of the sugar syrup in the cooked product.

It is well known that, as the sugar concentration of a solution increases, the viscosity of the solution also increases. FIG. 4 shows the relationship between the sugar concentration, temperature, and viscosity. Very concentrated solutions, while having relatively low viscosities at high temperatures, have very high viscosities at low temperatures. When the sugar concentration of the solution increases, and then the temperature decreases the viscosity can increase to the point where the solution becomes an amorphous (non-crystalline) solid, i.e., a glass. Analytical testing of the hard spots in microwave baked brownies shows a lack of starch gelatinization, a lack of sugar crystallization, and a very low moisture content ( about 5.0%). This hard texture may be a result of a very viscous sugar syrup (if not an actual glass) that forms upon cooling and acts like a glue in coating the other brownie ingredients.

The present invention controls the texture of microwave-baked brownies by regulating the steam retention capabilities of the batter. It has been found that a correlation exists between types and amounts of emulsifiers used in the batter and the texture of the final cooked brownie product.

Some emulsifiers which can be incorporated in the brownie mix in order to control the texture of a microwave baked brownie are the following: diacetyl tartaric esters, sodium stearoyl lactylate, hexaglycerol distearate, mono- and di-glycerides, lactylated monoglycerides, sucrose esters, and ethoxylated monoglycerides.

As the emulsifiers vary in effectiveness, the percentage of emulsifiers in the system to effectively reduce hard spots changes, and may be present up to about 6% by weight of the dry mix. The mix is referred to as a dry mix, but its components contain minor amounts of water.

A brownie batter containing one or more of the above emulsifiers has been found to have increased water retention during microwave baking. It was found that the heating rates of the brownie batter could be controlled by addition of these emulsifiers, and that brownies with regions that did not achieve as high maximum temperatures did have higher moisture levels.

DETAILED DESCRIPTION OF THE INVENTION

Figure 1:
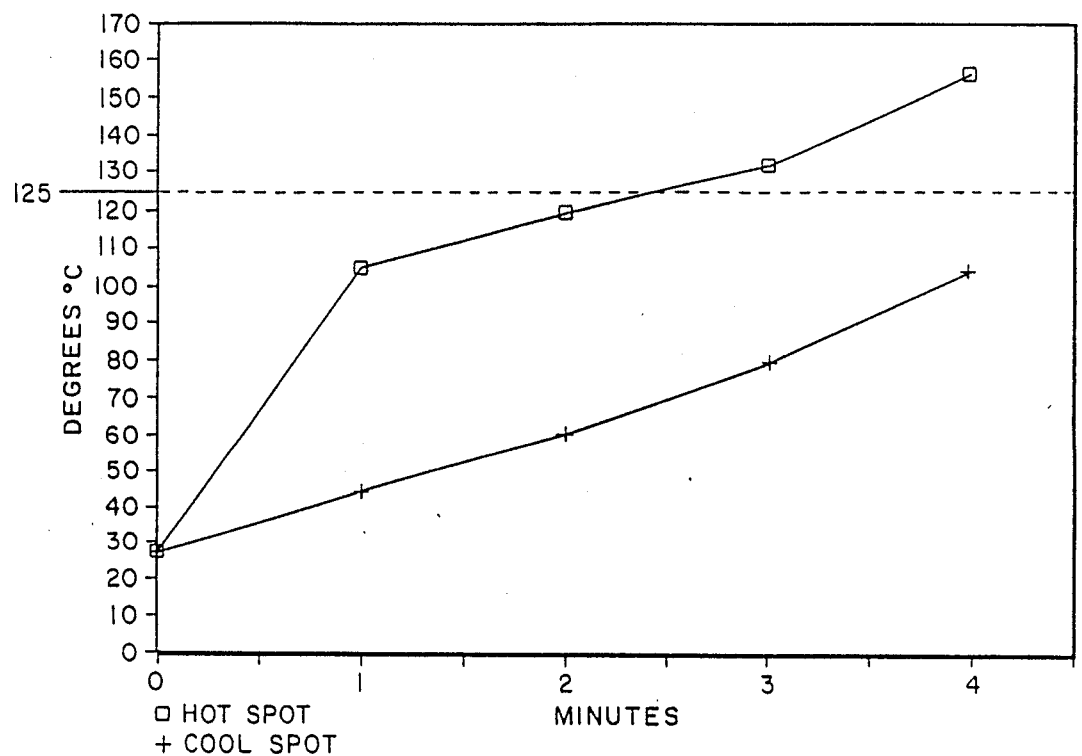
FIG. 1 shows the heating rates of hot and cool spots of microwave cooked fudgey brownies prepared from a conventional recipe without the improvement of the present invention.
Figure 2:
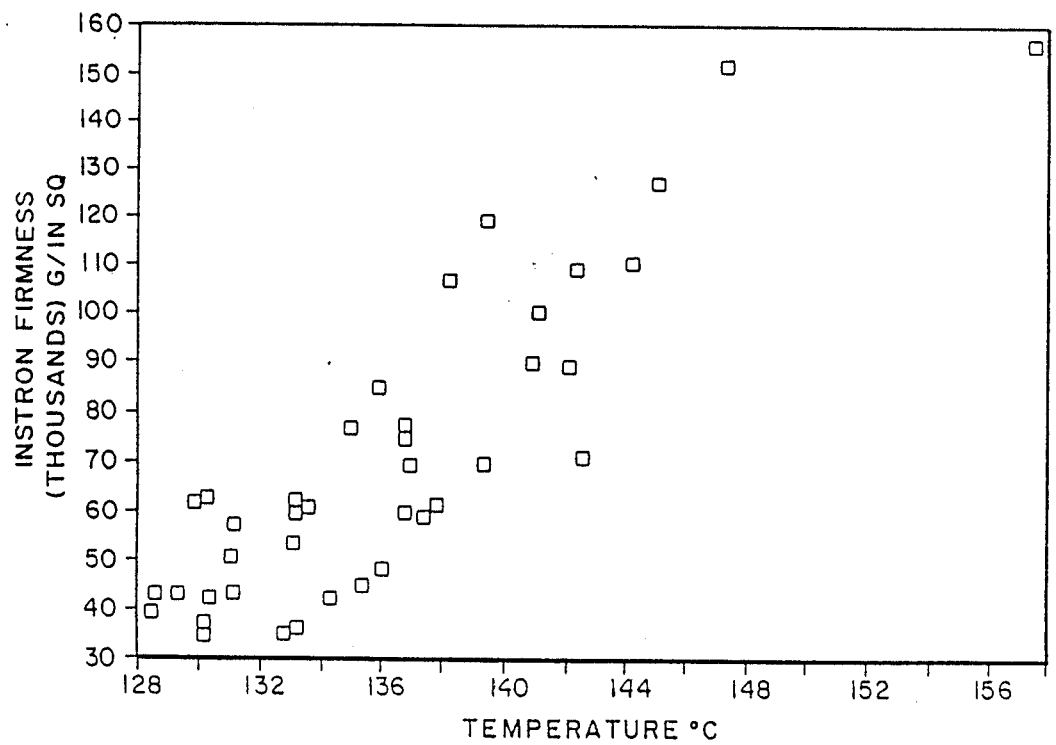
FIG. 2 shows the Instron firmness of hot spots versus temperature (° C) for emulsified (invention) and non emulsified brownie batters. Instron units are expressed in grams per square inch.
Figure 3:
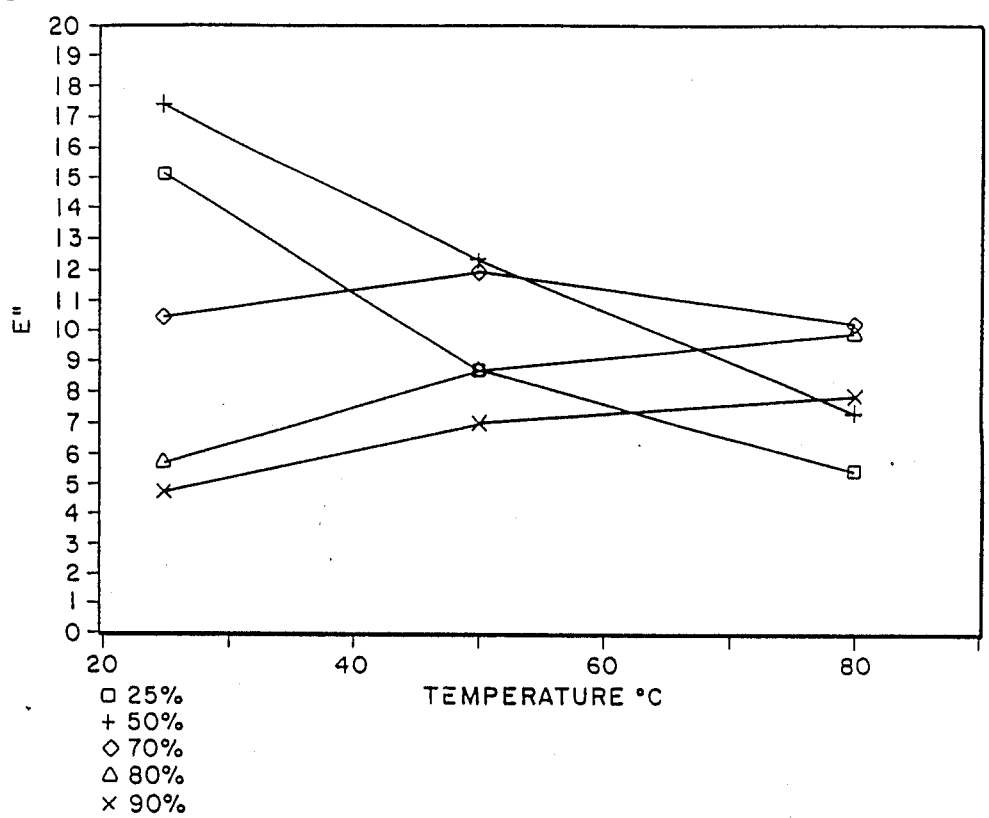
FIG. 3 shows the dielectrics of 50/50 sucrose/fructose sugar blends versus temperature (°0C) at various sugar concentrations.
Figure 4:
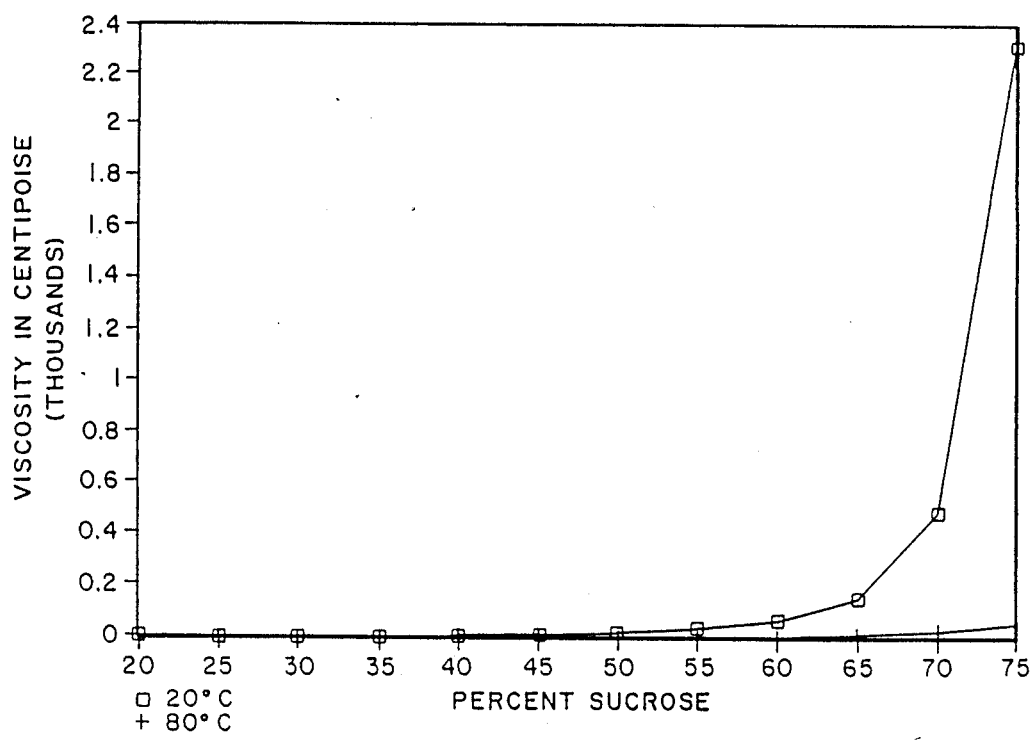
FIG. 4 shows the viscosity in centipoise versus concentration of sucrose solutions at 25 and 80 degrees C.

The mix or batter for brownies according to the present invention can be a conventional mix or batter with the correct type and amount of emulsifier, or other agents to achieve higher steam retention, added to achieve effective steam retention to prevent hard spots. A conventional brownie mix can be used. The addition of the correct emulsifier or other agent which increases steam retention reduces the formation of hot spots. The emulsifier can be used in amounts ranging from about 0.5% to about 6% by weight of mix to achieve higher steam retention, although it has been found that an overall more desirable brownie is obtained when the amount of emulsifier ranges from about 0.5% to about 2% by weight of mix. Generally, the greater the amount of emulsifier, the better the texture of the brownie. The amount of emulsifier used may be limited by flavor considerations or regulatory limits on such use. As used herein, unless otherwise noted, all percentages are by weight dry mix.

The dry mix used in the following examples had the formulation as shown in Table 1A.

TABLE 1A

| Emulsified dry mix for examples | |
|---|---|
| Ingredient | Percentage (as is basis) |
| sugar | 47.70 |
| flour | 32.86 |
| cocoa | 7.98 |
| shortening | 7.00 |
| albumen | 1.27 |
| salt | 0.76 |
| flavor | 0.25 |
| xanthan gum | 0.15 |
| enrichment | 0.03 |
| EMULSIFIER* | 2.00 |
| total | 100.00 |

*Powdered emulsifiers were blended in with dry ingredients, while solid emulsifiers were melted with shortening. All formulas were subjected to high speed blending.

A preferred emulsified brownie mix is as follows, and with the addition of water and oil, the total water content (added water plus that contained in the ingredients) is about 19.22% by weight. Total batter formula shown in Table 1B.

TABLE 1B

| Ingredient | Normal |
|---|---|
| flour (10% H$_2$O) | 23.39 |
| sugar | 34.08 |
| shortening | 5.00 |
| cocoa (5% H$_2$O) | 5.83 |
| albumen | 0.91 |
| salt | 0.54 |
| flavor | 0.18 |
| enrichment | 0.02 |
| Xanthan | 0.11 |
| malto dextrin | 0.72 |
| mono- and diglycerides | 0.72 |
| mix | 71.50 |
| water | 16.59 |
| oil | 11.91 |
| TOTAL WATER | 19.22 |

To prepare the brownies, 51 grams of oil and 74 grams of 116°F water were added to 306 grams of dry mix. The mixture was stirred until wetted, and then stirred for an additional 50 strokes with a rubber spatula. The resultant batter was then poured into a 7.0 inch square polypropylene pan and cooked on high power in a 700 watt microwave oven positioned in the same oven and location for four minutes. Heating rates were taken with Luxtron probes as the brownies cooked, and Instron measurements were taken after the brownies had set at room temperature for three to five hours.

Table 1C gives acceptable amounts of ingredients for the mix of the present invention.

TABLE 1C

| Ingredient | Mix | Plus | Normal | Minus |
|---|---|---|---|---|
| flour | 32.70 | 20.86 | 23.39 | 25.93 |
| sugar | 47.67 | 30.42 | 34.08 | 37.80 |
| shortening | 7.00 | 4.47 | 5.00 | 5.55 |
| cocoa | 8.16 | 5.21 | 5.83 | 6.47 |
| albumen | 1.27 | 0.81 | 0.91 | 1.01 |
| salt | 0.76 | 0.48 | 0.54 | 0.60 |
| flavor | 0.25 | 0.16 | 0.18 | 0.20 |
| enrichment | 0.03 | 0.02 | 0.02 | 0.02 |
| xanthan | 0.16 | 0.10 | 0.11 | 0.13 |
| maltrin | 1.00 | 0.64 | 0.72 | 0.79 |
| mono + di | 1.00 | 0.64 | 0.72 | 0.79 |
| mix | 100.00 | 63.81 | 71.50 | 79.29 |

TABLE 1C-continued

| Ingredient | Mix | Plus | Normal | Minus |
|---|---|---|---|---|
| water | | 20.77 | 16.59 | 12.88 |
| oil | | 15.42 | 11.91 | 7.83 |
| Total Water | 3.68 | 23.12 | 19.22 | 15.79 |

Ideally, the ranges for ingredients of the mix according to the present invention are shown in Table 1D.

TABLE 1D

| Ingredient | Range, % by weight |
|---|---|
| flour | 27–39 |
| sugar | 38–58 |
| fats | 5–20 |
| emulsifier | 0.5–6.0 |
| humectants | 1.0–7.0 |
| cocoa | 3–15 |

Table 1E shows the ranges for ingredients in the batter according to the present invention:

TABLE 1E

| Ingredient | Range, % by weight |
|---|---|
| flour | 15–30 |
| sugar | 26–41 |
| fat | 8–25 |
| water | 10–25 |
| emulsifier | 0.3–4.0 |
| humectant | 0.5–5.0 |
| cocoa | 2–12 |

Ingredient Range, % by weight flour 15-30 sugar 26-41 fat 8-25 water 10-25 emulsifier 0 3-4.0 humectant 0.5-5.0 cocoa 2-12

Table 1F shows the ranges of ingredients in a brownie cooked by microwave energy according to the present invention.

TABLE 1F

| Ingredient | Range, % by weight |
|---|---|
| flour | 16–32 |
| sugar | 28–44 |
| fat | 8.5–27 |
| water | 6–15 |
| emulsifier | 0.35–4.5 |
| humectants | 0.35–4.5 |
| cocoa | 2.2–13 |

TABLE 1F Ingredient Range, % by weight flour 16-32 sugar 28-44 fat 8.5-27 water 6-15 emulsifier 0.35-4.5 humectants 0.35-4 5 cocoa 2.2-13

The major response used to quantitate the textural uniformity of the brownie was a parallel plate compression test. Brownie core samples (1.75 inch diameter) were compressed to 65% of their original height. Compression pressures were calculated using the Instron Series Nine Materials Testing System Software version 2.51m. The Young's modulus is calculated by determining the slope of the straightest portion of the compression curve measured between five and twenty percent compression of the brownie core sample.

Sugar and starch characterization was performed microscopically. In both cases polarized light was used to confirm the presence or absence of crystallinity. Under polarized light, crystalline sugar appears as multicolored crystals, whereas amorphous sugar is colorless and without defined crystal boundaries. Starch is easily characterized as gelatinized or nongelatinized, under polarized light, by the absence of the light cross on gelatinized granules.

Top surface hot and cold spots were identified by using an Agema Infrared Thermometry System (Omega, Inc.). This technique produced a relative profile of the heating pattern present in the microwave oven used.

Heating rates during cooking were measured using a Luxtron Fluroptic Thermometry System. This instrument is capable of recording heat generated in the product during microwave cooking without being affected by the microwave field. Probes were vertically inserted through the bottom of the pan and brownie in known hot and cool spots about 0.75 inches from the bottom of the brownie pan.

The bottom of the Litton Generation II microwave oven used was removed and replaced with a screen to facilitate Luxtron probe placement through the bottom of the brownie. The mesh size of the screen was 0.125 inches.

Moisture measurements were performed using a vacuum method. Samples were held at 70° C. under a 50 mm Hg vacuum for 16 hours. Loss of weight due to volatilization of components including moisture from the original sample is calculated as loss of moisture content.

Steam retention capabilities of the brownie batters were determined as follows. Fifteen grams of sample batter at 22° C was placed in a 50 ml graduated Kimax cylinder No. 20024-D, tapped until batter was level, and microwaved in a 700 watt oven for 30 seconds. The sample batter should be unleavened i.e. contain no non-aqueous leaveners e.g. those that produce $CO_2$. This test is effective in differentiating between high and low steam retention for non-leavened batters. Addition of leavening to the batter may artificially inflate steam retention reading due to entrappment of $CO_2$ gas along with steam. If the product batter is to be leavened with non-aqueous leaveners then the test batter should have these eliminated for testing purposes. Steam retention performance was measured by the highest volume of batter achieved during the 30 second cook time. Dimensions of the graduated portion of the cylinder were about 12.75 cm high with a 2.25 cm inner diameter.

Table 2 shows the relative effectiveness of several emulsifiers in lowering the hot spot temperatures of brownies baked in a microwave oven. Table 2 also shows that lower heating rates result in hard spots in the brownie with lower Instron readings. It was found that the most effective emulsifiers, diacetyl tartaric acid ester, sodium stearoyl lactylate, and sucrose esters, are commonly used in baked products for volume increase, which is not generally a concern with a dense textured product like a brownie. A common characteristic among these emulsifiers is their ability to interact with flour proteins.

TABLE 2

Hot Spot Temperatures and Firmness Ratings

| Emulsifier | Hot Spot Temp. Deg. C. * | Firmness gm./inch2 * |
|---|---|---|
| Diacetyl tartaric acid esters (Panodan 150) | 129.9 | 37,250 |
| Sodium stearoyl lactylate | 130.2 | 39,850 |
| Hexaglycerol distearate (Polyaldo 6-S-2) | 130.2 | 43,200 |
| Diacetyl tartaric acid esters | 131.0 | 54,325 |

TABLE 2-continued

| Hot Spot Temperatures and Firmness Ratings | | |
|---|---|---|
| Emulsifier | Hot Spot Temp. Deg. C.* | Firmness gm./inch2* |
| (Panodan 235) Mono and di-glycerides | 135.2 | 59,000 |
| (Dimodan PV300K) Lactylated Monoglycerides | 136.3 | 61,728 |
| (Durlac 100) Ethoxylated monoglycerides | 140.9 | 70,600 |
| (Durfax EOM) Mono and di-glycerides | 141.5 | 100,908 |
| (Dur-lo) Non-Emulsified batter | 144.7 | 120,077 |

*Average of duplicate readings

TABLE 2
Spot Temperatures and Firmness Ratings
Hot
Hot Spot Temp. Firmness Emulsifier Deg. C. gm./inch2 Diacetyl tartaric acid esters 129.9 37,250

(Panodan 150) Sodium stearoyl lactylate 130.2 39,850 Hexaglycerol distearate 130.2 43,200

(Polyaldo 6-S-2) Diacetyl tartaric acid esters 131.0 54,325

(Panodan 235) Mono and di-glycerides 135.2 59,000

(Dimodan PV300K) Lactylated Monoglycerides 136.3 61,728

(Durlac 100) Ethoxylated monoglycerides 140.9 70,600

(Durfax EOM) Mono and di-glycerides 141.5 100,908

(Dur-lo) Non-Emulsified batter 144.7 120,077 * Average of duplicate readings

Observation of a non emulsified batter during cooking shows that the volume of the brownie hot out of the microwave is very similar to the volume of the brownie after it has totally cooled. The cool volume is slightly less than the hot volume due to contraction upon cooling. Batters containing an emulsifier according to the present invention, however, have a much greater hot volume immediately after baking, probably due to increased steam retention, while their cool volume is similar to that of conventional brownies.

Table 3 ranks the emulsifiers tested with respect to steam retention capacity as quantified by the previously described steam retention step.

TABLE 3

| Emulsifier Steam Retention Rankings | |
|---|---|
| Emulsifier | Relative Steam Retention |
| Hexaglycerol distearate (Polyaldo 6-S-2) | 100 |
| Sodium stearoyl lactylate | 63 |
| Sucrose esters | 58 |
| Diacetyl tartaric acid esters (Panodan 150) | 51 |
| Diacetyl tartaric acid esters (Panodan 235) | 30 |
| Mono and di-glycerides (Dimodan PV300K) | 18 |
| Lactylated Monoglycerides (Durlac 100) | 0 |
| Ethoxylated monoglycerides (Durfax EOM) | 0 |
| Mono and di-glycerides (Dur-lo) | 0 |
| Non-Emulsified batter | 0 |

TABLE 3
Emulsifier Steam Retention Rankings Emulsifier Relative Steam Retention Hexaglycerol distearate 100

(Polyaldo 6-S-2) Sodium stearoyl lactylate 63 Sucrose esters 58 Diacetyl tartaric acid esters 51

(Panodan 150) Diacetyl tartaric acid esters 30

(Panodan 235) Mono and di-glycerides 18

(Dimodan PV300K) Lactylated Monoglycerides 0

(Durlac 100) Ethoxylated monoglycerides 0

(Durfax EOM) Mono and di-glycerides 0

(Dur-lo) Non-Emulsified batter 0

It is believed that the emulsifiers interact with the flour proteins in such a way that the steam retention capabilities of the batter is increased. As a result, during baking, higher volumes are achieved. Upon cooling, the entrapped steam recondenses and is reabsorbed into the sugar-water solution. Gelatinization of starch is often responsible for setting the expanded structure of a baked product. The lack of starch gelatinization, because of the low initial moisture of the batter, allows the brownie to contract to the same volume upon cooling as a nonemulsified product.

Figure 5:
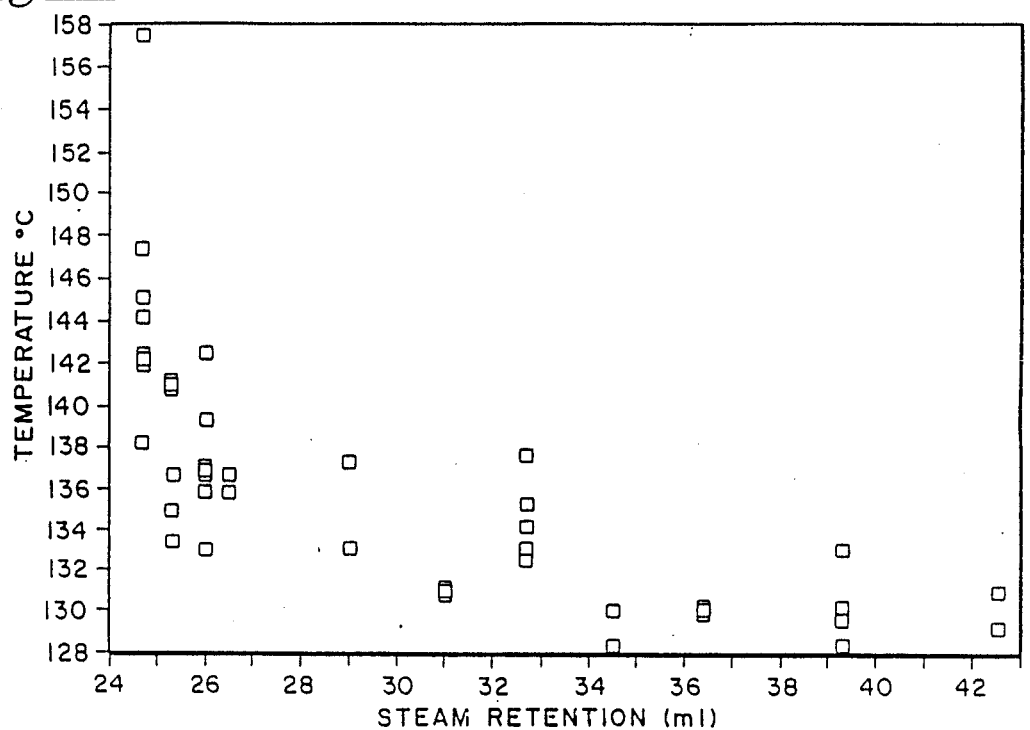
FIG. 5 shows the temperature of hot spots (°0C) versus steam retention of emulsified (invention) and non emulsified brownie batter.

FIG. 5 shows the relationship established between steam retention and final hot spot temperature. The improved steam and moisture retention in emulsified brownies could inhibit temperature rise during cooking through a lowering of the boiling point. As shown, the hot spot temperature decreases as steam retention increase Table 4 shows the relationship between total moisture content and boiling point rise for a sucrose/corn syrup blend.

TABLE 4

| Boiling points of 50/50 Sucrose-Corn Syrup Blends | | | |
|---|---|---|---|
| Solids % | Degrees C. | Solids % | Degrees C. |
| 0 | 100.00 | 90 | 119.44 |
| 20 | 100.33 | 92 | 123.72 |
| 40 | 101.06 | 94 | 129.44 |
| 60 | 102.83 | 96 | 138.22 |
| 80 | 108.89 | 98 | 156.06 |
| 85 | 112.78 | 99 | 179.83 |

TABLE 4 Boiling points of 50/50 Sucrose-Corn Syrup Blends Solids % Degrees C. Solids % Degrees C. 0 100.00 90 119.44 20 100.33 92 123.72 40 101.06 94 129.44 60 102.83 96 138.22 80 108.89 98 156.06 85 112.78 99 179.83

Figure 6A:
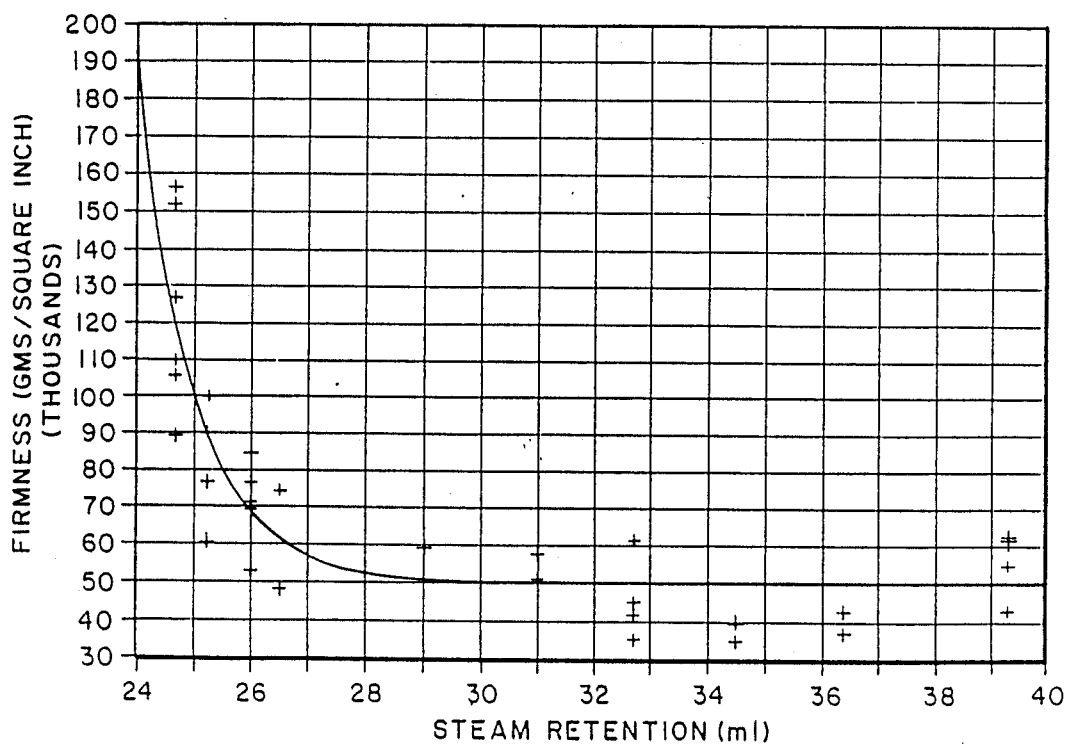
FIG. 6A shows the Instron firmness of hot spots versus steam retention.

FIG. 6A shows a relationship between steam retention and hot spot hardness. As steam retention increases, it has been found that the hard spots are not as hard. From the graph, batters with steam retention values of about 27 or more would be most desirable for control of hard spots. It is possible that the increased moisture content of the emulsified brownies helps to soften the hard spots by decreasing the sugar concentration in the aqueous phase. The less concentrated sugar solution would have a lower glass transition temperature, which means that the sugar "glue" holding the brownie together would be lower in viscosity, and hence, softer.

Figure 6B:
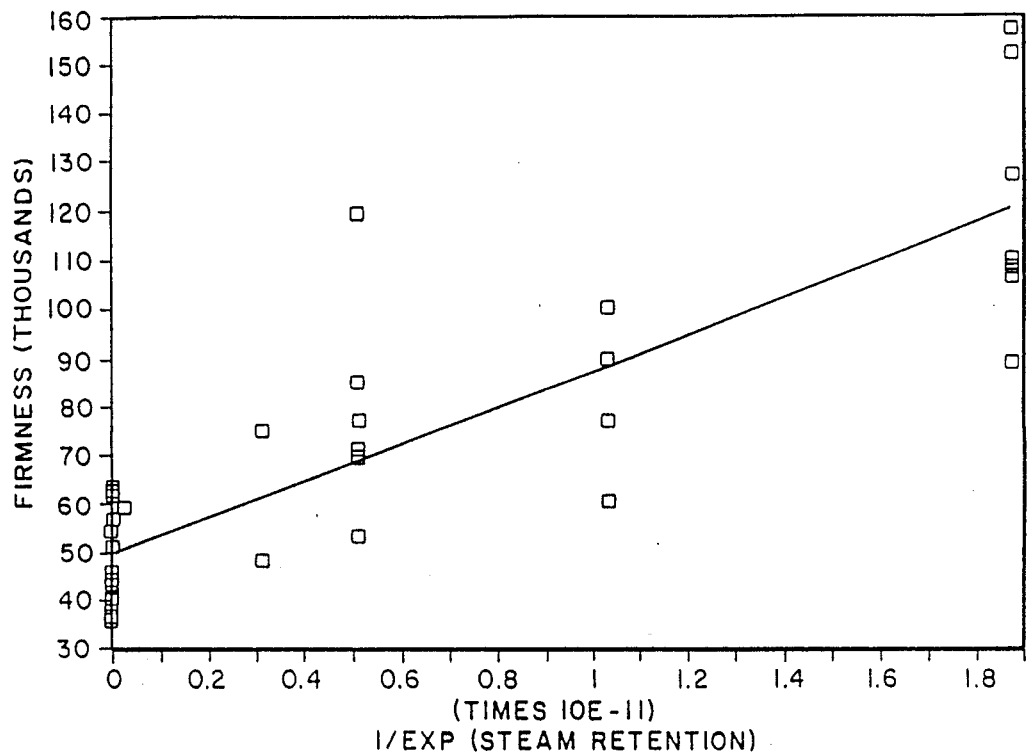
FIG. 6B shows the Instron firmness vs. 1/sample (steam retention).

FIG. 6B shows that a linear relationship is obtained when hot spot hardness (firmness) is plotted versus 1/e (steam retention). The equation best defining this relationship is:

$$\text{firmness} = \frac{3.8 \times 10^{15}}{e^{(\text{steam retention})}} + 49,696$$

firmness = 3.8 x 1015 +49,696
e (steam retention)

Figure 6C:
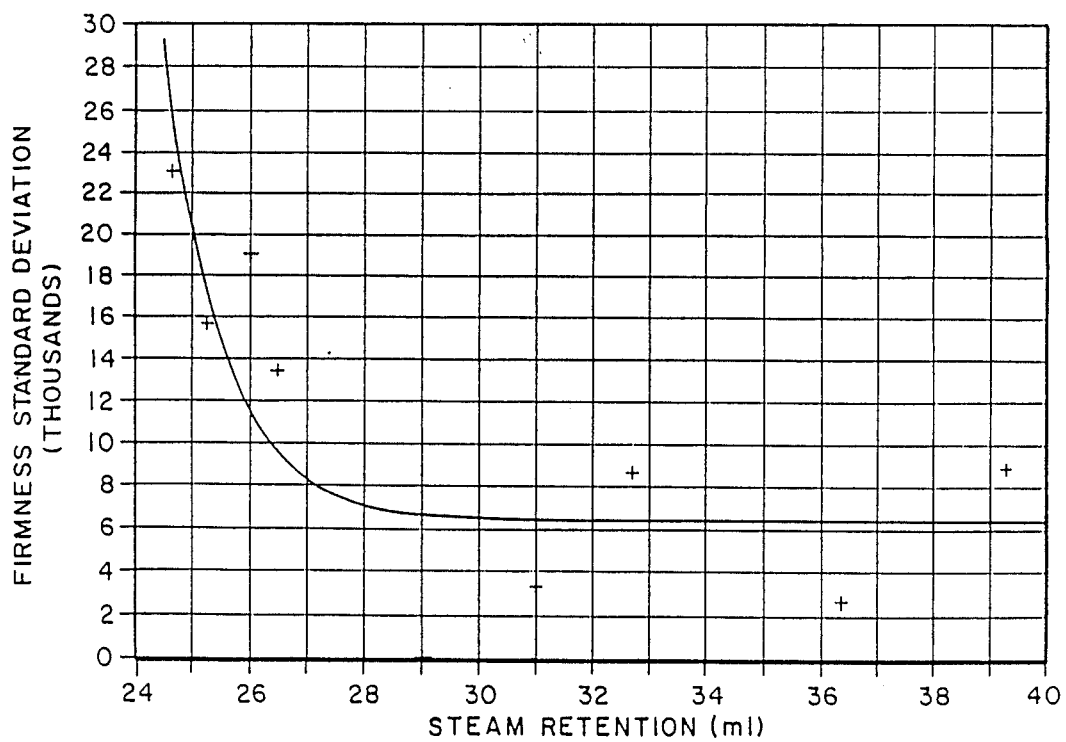
FIG. 6C shows the standard deviation of Instron firmness vs. steam retention.

FIG. 6C shows a plot of the standard deviations on replicated firmness measurements versus steam retention. The line best fitting the data shown on FIG. 6A indicates that the standard deviation increases significantly below about 27 ml steam retention. This indicates that the predictability and hence control of firmness below this value is poor.

Not only is the brownie texture softened by retaining water through improved steam retention, but it is done so in a way that does not promote gelatinization. Thus, a relatively uniformly soft textured fudgey type microwave brownie can be achieved. More importantly, the present invention provides a method for reducing or eliminating hard spots without changing the texture of the brownie.

The relative softening effectiveness of emulsifiers is shown in Table 5. The effectiveness of the emulsifiers was calculated from Table 2, where the temperature of the hot spots was compared to the firmness.

TABLE 5

| Relative Softening Effectiveness of Emulsifiers | | |
|---|---|---|
| Emulsifier | Relative Rating * | Firmness gm/inch² * |
| Diacetyl tartaric acid esters (Panodan 150) | 1.00 | 37,250 |
| Sodium stearoyl lactylate | 1.07 | 39,850 |
| Hexaglycerol distearate (Polyaldo 6-S-2) | 1.16 | 43,200 |
| Diacetyl tartaric acid esters (Panodan 235) | 1.46 | 54,325 |
| Mono and di-glycerides (Dimodan PV300K) | 1.60 | 59,500 |
| Lactylated Monoglycerides (Durlac 100) | 1.66 | 61,728 |
| Ethoxylated monoglycerides (Durfax EOM) | 1.89 | 70,600 |
| Mono and di-glycerides (Dur-lo) | 2.71 | 100,908 |
| Non-Emulsified batter | 3.22 | 120,077 |

*Average of duplicate readings.

Figure 7:
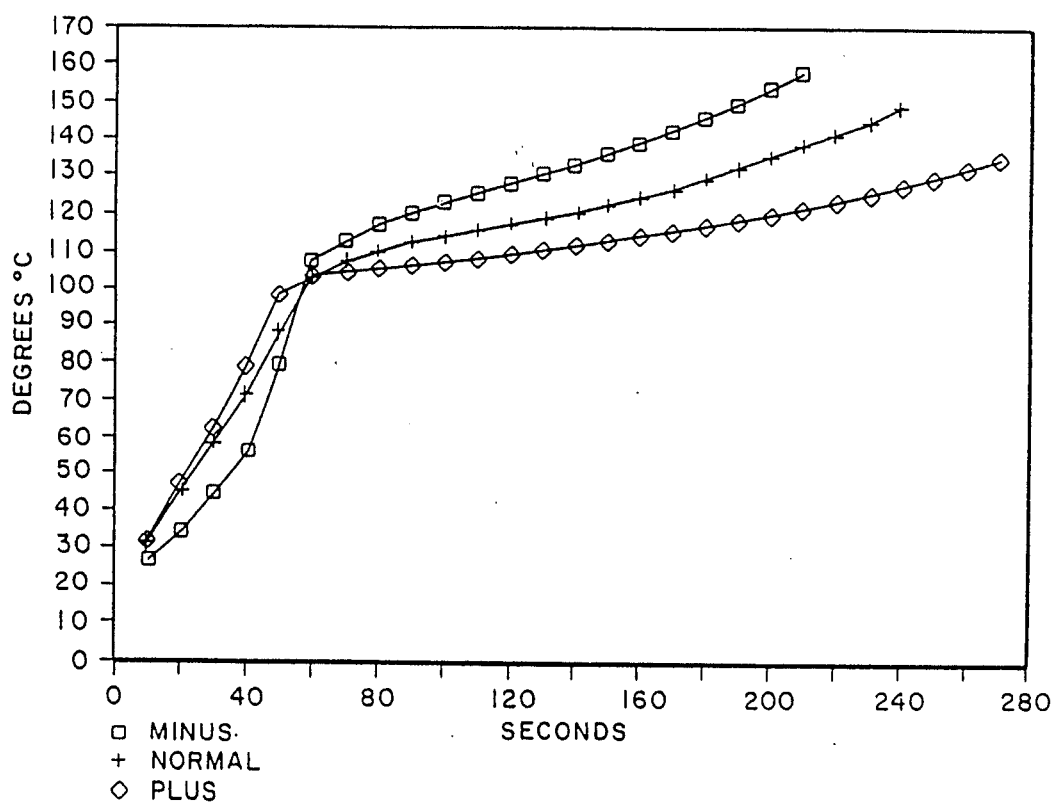
FIG. 7 shows hot spot heating in degrees C for three brownie formulations (non-emulsified) of varying initial water content.

It has also been found that hard spots, and heating rates, can be manipulated by simply varying the initial moisture content of the brownie batter, as shown in FIG. 7. As mentioned supra, high moisture baked goods had softer hard spots than lower moisture baked goods. FIG. 7 demonstrates the heating rate change due to increased batter moisture. Even though the high moisture batters require additional cooking time to achieve the same degree of doneness, the final brownie texture is improved over lower water, non-invention brownies. In addition to the change in heating rate, the physical appearance and texture of the high moisture brownie is also changed. The brownie becomes more cake like. Apparently, some of the starch is able to gelatinize at the higher moisture levels, and a higher volume, more cake-like brownie is produced. This type of brownie can be an alternative to the fudge-like brownie obtained with the use of emulsifiers and is not as dependent on steam retention capabilities of the batter for control of hard spot formation. This system is particularly useful when a different texture is desired.

Particulates, for example, chocolate or other flavored chips can be added to provide a fudgier texture. They can be added in any desired quantity e g in the range of between about 5% and about 10% by weight of batter.

A particularly advantageous method for baking the brownie of the present invention comprises the use of a grid located above the brownie batter during baking. A preferred grid comprises a sheet of aluminum foil laminated to a sheet of paperboard, having a plurality of circular holes of about 3.8 cm. with center-to-center spacing of about 5 cm. The outer dimensions of this grid generally extend beyond the edges of the baking pan from about 3.6 cm. to about 11.4 cm. The grid is preferably spaced about 6 cm. above the surface of the brownie batter during baking.

The amount of steam retention of the brownie batter was found to influence the texture of the brownie. An acceptable brownie was obtained when the steam retention was at least about 27 ml. A better brownie was obtained when the steam retention was at least about 28.5 ml. The best brownie was obtained when the steam retention was a least about 30 ml.

It was found that the amount of water in the total brownie volume determined the final texture of a microwave brownie A water content of at least about 6% in 70% of the total volume of the brownie provided an acceptable brownie. A better brownie is obtained when the water content is at least about 8% in 80% of the total volume of the brownie. The best product is obtained when the water content is at least about 10% in 90% of the total volume of the brownie.

A brownie as defined herein includes a high sugar/low total water system. The total water includes water from the mix as well as the water added to make a batter. The flour in the mix typically contains about 10% water, and the cocoa in the mix typically contains about 5% water.

For the present invention, a high sugar/low water batter has a sugar:water ratio of at least 1:1, preferably at least 1.2:1, and more preferably at least 1.5:1, all ratios being by weight.

Another method of controlling texture is by limiting the maximum temperature during baking. Temperature measurement can be accomplished by infrared camera or by temperature probe. An acceptable brownie is obtained when the maximum internal temperature is less than about 140° C in at least 70% of the total volume. An improved brownie is obtained when the maximum internal temperature is less than about 130° C. The best brownie is obtained when the maximum internal temperature is less than about 125° C. It is preferred that these temperatures not be exceeded in at least about 70% of the total volume, preferably at least about 80%, and more preferably at least about 90%.

It should be noted that the batter should preferably be rotated during baking in order to minimize hot spots. In all of the tests described in the present application, the measurements were taken without rotating the product during baking.

The maximum internal temperature of the brownie can also be regulated by altering the type of sugar used in the batter. Among the sugars that can be used as fructose, dextrose, sucrose, and mixtures thereof.

Humectants can also be added to provide a softer textured brownie. Among the humectants that can be added are polyhydric alcohols such as glycerol, and starch hydrolyzates, such as maltodextrins, corn syrup solids, and the like. The humectants can comprise from about 1% to 7% by weight of the mix, or from about 0.5% to about 5% by weight of the batter. A better texture is obtained with humectants comprising from about 1.0% to about 5% by weight of the batter, and the best texture is obtained with humectants comprising from about 1.3% to about 5% of the batter.

A preferred humectant combination is a mixture of maltodextrin and glycerol, preferably about 1% maltodextrin and from about 0% to about 2% of glycerol by weight of batter. Another humectant suitable for use in the present invention comprises about 1% maltodextrin and about 2% glycerol by weight of batter.

Sucrose in the brownie batter can be partially or completely replaced by fructose. This provides a more cake-like brownie without increasing the water content or the sugar:flour ratio of the batter. A fructose solution permits easier gelatinization of the starch than a sucrose solution. Thus, for batters having identical water contents, a fructose-containing batter will be more cake-like and will have softer hard spots than a comparable sucrose-containing batter.

The foregoing description of the specific embodiments will so fully reveal the general nature of the invention such that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A method for controlling the texture of brownies baked from a batter in a microwave oven comprising controlling the maximum internal temperature of the brownie during microwave baking wherein the maximum internal temperature of at least 70% of the total volume of the brownie is less than about 140°C.

2. The method of claim 1 wherein the maximum internal temperature is less than about 130°C.

3. The method of claim 2, wherein the maximum internal temperature is less than about 125°C.

* * * * *